(12) United States Patent
Seo et al.

(10) Patent No.: US 7,570,866 B2
(45) Date of Patent: Aug. 4, 2009

(54) RECORDING MEDIUM HAVING DATA STRUCTURE FOR MANAGING REPRODUCTION OF MULTIPLE REPRODUCTION PATH VIDEO DATA RECORDED THEREON AND RECORDING AND REPRODUCING METHODS AND APPARATUSES

(75) Inventors: Kang Soo Seo, Kyunggi-do (KR); Byung Jin Kim, Kyunggi-do (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 874 days.

(21) Appl. No.: 10/702,596

(22) Filed: Nov. 7, 2003

(65) Prior Publication Data

US 2004/0091241 A1    May 13, 2004

(30) Foreign Application Priority Data

Nov. 12, 2002  (KR)  .................... 10-2002-0069937
Nov. 20, 2002  (KR)  .................... 10-2002-0072516

(51) Int. Cl.
*G11B 27/00*    (2006.01)

(52) U.S. Cl. .......................... 386/55; 386/125
(58) Field of Classification Search ................. 386/49, 386/55, 95, 125
See application file for complete search history.

(56) References Cited

U.S. PATENT DOCUMENTS

| 5,521,898 | A | 5/1996 | Ogasawara |
| 5,559,808 | A | 9/1996 | Kostreski et al. |
| 5,602,956 | A | 2/1997 | Suzuki et al. |
| 5,651,010 | A | 7/1997 | Kostreski et al. |
| 5,729,549 | A | 3/1998 | Kostreski et al. |
| 5,732,185 | A | 3/1998 | Hirayama et al. |
| 5,742,569 | A | 4/1998 | Yamamoto et al. |
| 5,747,136 | A | 5/1998 | Shono et al. |
| 5,771,334 | A | 6/1998 | Yamauchi et al. |
| 5,784,528 | A | 7/1998 | Yamane et al. |
| 5,819,003 | A | * 10/1998 | Hirayama et al. ............. 386/95 |
| 5,835,493 | A | 11/1998 | Magee et al. |
| 5,854,873 | A | 12/1998 | Mori et al. |

(Continued)

FOREIGN PATENT DOCUMENTS

CN        1134583        10/1996

(Continued)

OTHER PUBLICATIONS

Search Report for corresponding European Application No. 03761863.4 dated Mar. 25, 2008.

(Continued)

*Primary Examiner*—Thai Tran
*Assistant Examiner*—Mishawn Dunn
(74) *Attorney, Agent, or Firm*—Harness, Dickey & Pierce (57) ABSTRACT

The recording medium has a data structure for managing reproduction of at least multiple reproduction path video data recorded on the recording medium. A data area of the recording medium has more than one reproduction path of video data recorded therein. Each reproduction path is recorded as at least one file, and each file associated with one reproduction path is separate from each file associated with another reproduction path such that portions of each file are not interleaved with portions of other files.

29 Claims, 7 Drawing Sheets

U.S. PATENT DOCUMENTS

| | | | |
|---|---|---|---|
| 5,870,523 A | 2/1999 | Kikuchi et al. | |
| 5,877,817 A | 3/1999 | Moon | |
| 5,884,004 A | 3/1999 | Sato et al. | |
| 5,884,044 A * | 3/1999 | Marsanne et al. | 709/232 |
| 5,895,124 A | 4/1999 | Tsuga et al. | |
| 5,909,257 A | 6/1999 | Ohishi et al. | |
| 5,913,010 A | 6/1999 | Kaneshige et al. | |
| 5,940,255 A | 8/1999 | Uwabo et al. | |
| 5,949,792 A | 9/1999 | Yasuda et al. | |
| 5,953,187 A | 9/1999 | Uwabo et al. | |
| 5,987,126 A | 11/1999 | Okuyama et al. | |
| 5,999,698 A | 12/1999 | Nakai et al. | |
| 6,031,962 A | 2/2000 | Sawabe et al. | |
| 6,035,095 A | 3/2000 | Kaneshige et al. | |
| 6,064,796 A | 5/2000 | Nakamura et al. | |
| 6,067,400 A | 5/2000 | Saeki et al. | |
| 6,167,189 A | 12/2000 | Taira et al. | |
| 6,181,870 B1 | 1/2001 | Okada et al. | |
| 6,181,872 B1 | 1/2001 | Yamane et al. | |
| 6,195,726 B1 | 2/2001 | Hogan | |
| 6,219,488 B1 | 4/2001 | Mori et al. | |
| 6,222,805 B1 | 4/2001 | Mori et al. | |
| 6,285,825 B1 | 9/2001 | Miwa et al. | |
| 6,321,027 B2 | 11/2001 | Honjo | |
| 6,336,002 B1 | 1/2002 | Yamauchi et al. | |
| 6,343,062 B1 | 1/2002 | Furukawa et al. | |
| 6,351,442 B1 | 2/2002 | Tagawa et al. | |
| 6,353,613 B1 | 3/2002 | Kubota et al. | |
| 6,360,055 B1 | 3/2002 | Kaneshige et al. | |
| 6,377,747 B1 | 4/2002 | Murase et al. | |
| 6,385,388 B1 | 5/2002 | Lewis et al. | |
| 6,385,389 B1 | 5/2002 | Maruyama et al. | |
| 6,385,394 B1 | 5/2002 | Okada et al. | |
| 6,385,398 B1 | 5/2002 | Matsumoto | |
| 6,393,574 B1 | 5/2002 | Kashiwagi et al. | |
| 6,415,101 B1 | 7/2002 | DeCarmo et al. | |
| 6,424,797 B1 | 7/2002 | Murase et al. | |
| 6,445,872 B1 | 9/2002 | Sano et al. | |
| 6,470,140 B1 | 10/2002 | Sugimoto et al. | |
| 6,470,460 B1 | 10/2002 | Kashiwagi et al. | |
| 6,480,669 B1 | 11/2002 | Tsumagari et al. | |
| 6,504,996 B1 | 1/2003 | Na et al. | |
| 6,515,101 B1 | 2/2003 | Sheares | |
| 6,546,195 B2 | 4/2003 | Kashiwagi et al. | |
| 6,556,774 B2 | 4/2003 | Tsumagari et al. | |
| 6,564,006 B1 | 5/2003 | Mori et al. | |
| 6,567,608 B2 | 5/2003 | Mori et al. | |
| 6,573,819 B1 | 6/2003 | Oshima et al. | |
| 6,584,277 B2 | 6/2003 | Tsumagari et al. | |
| 6,603,517 B1 | 8/2003 | Shen et al. | |
| 6,618,396 B1 | 9/2003 | Kondo et al. | |
| 6,654,543 B2 | 11/2003 | Ando et al. | |
| 6,788,883 B1 | 9/2004 | Park et al. | |
| 6,801,713 B1 | 10/2004 | Yagawa et al. | |
| 6,901,078 B2 | 5/2005 | Morris | |
| 6,904,227 B1 | 6/2005 | Yamamoto et al. | |
| 7,024,102 B1 | 4/2006 | Inoshita et al. | |
| 7,072,573 B2 | 7/2006 | Okada et al. | |
| 7,106,946 B1 | 9/2006 | Kato | |
| 7,124,303 B2 | 10/2006 | Candelore et al. | |
| 7,236,687 B2 * | 6/2007 | Kato et al. | 386/95 |
| 2001/0033517 A1 | 10/2001 | Ando et al. | |
| 2001/0038745 A1 | 11/2001 | Sugimoto et al. | |
| 2001/0043790 A1 | 11/2001 | Saeki et al. | |
| 2001/0053280 A1 | 12/2001 | Yamauchi et al. | |
| 2002/0015383 A1 | 2/2002 | Ueno | |
| 2002/0015581 A1 | 2/2002 | Ando et al. | |
| 2002/0021761 A1 | 2/2002 | Zhang et al. | |
| 2002/0031336 A1 | 3/2002 | Okada et al. | |
| 2002/0044757 A1 | 4/2002 | Kawamura et al. | |
| 2002/0046328 A1 | 4/2002 | Okada | |
| 2002/0076201 A1 | 6/2002 | Tsumagari et al. | |
| 2002/0097981 A1 | 7/2002 | Seo et al. | |
| 2002/0097984 A1 | 7/2002 | Abecassis | |
| 2002/0106196 A1 | 8/2002 | Yamauchi et al. | |
| 2002/0127002 A1 | 9/2002 | Mori et al. | |
| 2002/0145702 A1 | 10/2002 | Kato et al. | |
| 2002/0150383 A1 | 10/2002 | Kato et al. | |
| 2002/0159368 A1 | 10/2002 | Noda et al. | |
| 2002/0180803 A1 | 12/2002 | Kaplan et al. | |
| 2002/0196365 A1 | 12/2002 | Cho et al. | |
| 2002/0197059 A1 | 12/2002 | Cho et al. | |
| 2003/0002194 A1 | 1/2003 | Andoh | |
| 2003/0026597 A1 | 2/2003 | Cho et al. | |
| 2003/0118327 A1 | 6/2003 | Um et al. | |
| 2003/0123849 A1 | 7/2003 | Nallur et al. | |
| 2003/0133509 A1 | 7/2003 | Yanagihara et al. | |
| 2003/0161615 A1 | 8/2003 | Tsumagari et al. | |
| 2003/0221055 A1 | 11/2003 | Okada | |
| 2003/0235403 A1 | 12/2003 | Seo et al. | |
| 2003/0235404 A1 | 12/2003 | Seo et al. | |
| 2003/0235405 A1 | 12/2003 | Seo et al. | |
| 2004/0086261 A1 * | 5/2004 | Hanes | 386/52 |
| 2004/0156621 A1 | 8/2004 | Seo et al. | |
| 2004/0179819 A1 | 9/2004 | Cho et al. | |
| 2004/0179820 A1 * | 9/2004 | Kashiwagi et al. | 386/95 |
| 2004/0179827 A1 | 9/2004 | Cho et al. | |
| 2004/0247290 A1 | 12/2004 | Seo et al. | |
| 2004/0252975 A1 | 12/2004 | Cho et al. | |
| 2005/0025459 A1 | 2/2005 | Kato et al. | |
| 2005/0036763 A1 | 2/2005 | Kato et al. | |
| 2006/0222340 A1 | 10/2006 | Yamauchi et al. | |

FOREIGN PATENT DOCUMENTS

| | | |
|---|---|---|
| CN | 1163673 | 2/1997 |
| CN | 1197574 | 4/1997 |
| CN | 1150293 | 5/1997 |
| CN | 1197573 A | 10/1998 |
| CN | 1272209 | 2/1999 |
| CN | 1220458 | 6/1999 |
| CN | 1251680 | 7/1999 |
| CN | 1237852 | 12/1999 |
| CN | 1317200 | 2/2000 |
| CN | 1251461 | 4/2000 |
| EP | 0723216 | 7/1996 |
| EP | 0737980 | 10/1996 |
| EP | 0737980 | 5/1997 |
| EP | 0836183 | 4/1998 |
| EP | 0836189 | 4/1998 |
| EP | 0847198 | 6/1998 |
| EP | 0873022 | 10/1998 |
| EP | 0896337 | 2/1999 |
| EP | 0917355 | 5/1999 |
| EP | 0918438 | 5/1999 |
| EP | 0920203 | 6/1999 |
| EP | 0940983 | 9/1999 |
| EP | 1003338 A2 | 5/2000 |
| EP | 1 043 724 | 10/2000 |
| EP | 1081885 | 3/2001 |
| EP | 1 126 454 A1 | 8/2001 |
| EP | 1198132 | 4/2002 |
| EP | 1198133 | 4/2002 |
| EP | 1202568 | 5/2002 |
| JP | 64-003781 | 1/1989 |
| JP | 01-116819 | 5/1989 |
| JP | 08-088832 | 4/1996 |
| JP | 08-235833 | 9/1996 |
| JP | 09-023403 | 1/1997 |
| JP | 09-251759 | 9/1997 |
| JP | 10-032780 | 2/1998 |
| JP | 10-040667 | 2/1998 |
| JP | 10-051737 | 2/1998 |
| JP | 10-269698 | 10/1998 |

| | | |
|---|---|---|
| JP | 10-271449 | 10/1998 |
| JP | 10-299698 | 11/1998 |
| JP | 11-041563 | 2/1999 |
| JP | 11-066813 | 3/1999 |
| JP | 11-103444 | 4/1999 |
| JP | 11-134812 | 5/1999 |
| JP | 11-185463 | 7/1999 |
| JP | 11-259976 | 9/1999 |
| JP | 11-346341 | 12/1999 |
| JP | 2000-030414 | 1/2000 |
| JP | 2000-041066 | 2/2000 |
| JP | 2000-069437 | 3/2000 |
| JP | 2000-113602 | 4/2000 |
| JP | 2000-149514 | 5/2000 |
| JP | 2000-235779 | 8/2000 |
| JP | 2000-293938 | 10/2000 |
| JP | 2000-299836 | 10/2000 |
| JP | 2000-348442 | 12/2000 |
| JP | 2001-24973 | 1/2001 |
| JP | 2001-024985 | 1/2001 |
| JP | 2001-067802 | 3/2001 |
| JP | 2001-111929 | 4/2001 |
| JP | 2001-111944 | 4/2001 |
| JP | 2001-111960 | 4/2001 |
| JP | 2001-169246 | 6/2001 |
| JP | 2001-297535 | 10/2001 |
| JP | 2001-332006 A | 11/2001 |
| JP | 2002-083486 | 3/2002 |
| JP | 2002-112179 | 4/2002 |
| JP | 2002-150685 | 5/2002 |
| JP | 2002-158972 | 5/2002 |
| JP | 2002-158974 | 5/2002 |
| JP | 2002-176623 | 6/2002 |
| JP | 2002-216460 | 8/2002 |
| JP | 2002-222581 | 8/2002 |
| JP | 2003-087744 | 3/2003 |
| JP | 2003-116100 | 4/2003 |
| JP | 2006-503400 | 1/2006 |
| KR | 10-1999-0022858 | 10/1997 |
| KR | 10-2000-0031861 | 6/2000 |
| KR | 10-2000-0055028 | 9/2000 |
| KR | 10-2000-0056179 | 9/2000 |
| KR | 10-2000-0065876 | 11/2000 |
| KR | 10-2001-0022702 | 3/2001 |
| KR | 10-0294884 | 4/2001 |
| KR | 10-2001-0098007 | 11/2001 |
| KR | 10-2001-0098101 | 11/2001 |
| KR | 10-2001-0107578 | 12/2001 |
| KR | 2002-0006674 | 1/2002 |
| KR | 10-2002-0020919 | 3/2002 |
| KR | 10-2002-0097454 | 12/2002 |
| KR | 10-2002-0097455 | 12/2002 |
| KR | 10-2004-0000290 | 1/2004 |
| KR | 10-2004-0030992 | 4/2004 |
| KR | 10-2004-0030994 | 4/2004 |
| KR | 10-2004-0030995 | 4/2004 |
| KR | 10-2004-0041581 | 5/2004 |
| TW | 391548 | 5/2000 |
| WO | WO 97/06531 | 2/1997 |
| WO | WO 97/13364 | 4/1997 |
| WO | WO 97/13365 | 4/1997 |
| WO | WO 97/13366 | 4/1997 |
| WO | WO 97/39451 | 10/1997 |
| WO | WO 98/00952 | 1/1998 |
| WO | WO 99/08281 | 2/1999 |
| WO | WO 99/34601 | 7/1999 |
| WO | WO 00/02195 | 1/2000 |
| WO | WO 00/05883 | 2/2000 |
| WO | WO 00/42515 | 7/2000 |
| WO | WO 00/62295 | 10/2000 |
| WO | WO 01/80239 | 10/2001 |
| WO | WO 01/82604 | 11/2001 |
| WO | WO 01/82606 | 11/2001 |
| WO | WO 01/82609 | 11/2001 |
| WO | WO 01/82610 | 11/2001 |
| WO | WO 2004/001748 | 12/2003 |
| WO | WO 2004/001750 | 12/2003 |
| WO | WO 2004/001753 | 12/2003 |
| WO | WO 2004/045206 A1 | 5/2004 |
| WO | WO 2004-075183 | 9/2004 |
| WO | WO 2004/077417 | 9/2004 |
| WO | WO 2004/079736 | 9/2004 |
| WO | WO 2004/081939 | 9/2004 |
| WO | WO 2004/086371 | 10/2004 |

OTHER PUBLICATIONS

Office Action for corresponding Japanese Application No. 2004-517368 dated May 7, 2008.
Office Action for corresponding Japanese Application No. 2004-517390 dated May 7, 2008.
Chinese Office Action dated Dec. 14, 2007.
Japanese Office Action dated Jan. 22, 2008.
European Search Report dated Dec. 28, 2007.
European Search Report dated Jan. 2, 2008.
United States Office Action dated Jan. 2, 2008.
United States Office Action dated Jan. 28, 2008.
Office Action for corresponding Chinese application dated Dec. 14, 2007 and English translation thereof.
European Search Report dated Aug. 13, 2008 corresponding to Application No. EP03811139.9.
Japanese Office Action dated Apr. 22, 2008 with translation for Japanese Application No. 2006-196199.
Japanese Office Action dated May 20, 2008 for Japanese Application No. 2004-551246.
Japanese Office Action corresponding to Japanese Application No. 2004-517390 dated Nov. 4, 2008.

* cited by examiner

RECORDING MEDIUM HAVING DATA STRUCTURE FOR MANAGING REPRODUCTION OF MULTIPLE REPRODUCTION PATH VIDEO DATA RECORDED THEREON AND RECORDING AND REPRODUCING METHODS AND APPARATUSES

FOREIGN PRIORITY

The present invention claims priority under 35 U.S.C. 119 on Korean Application No. 10-2002-0072516 filed Nov. 20, 2002, Korean Application No. 10-2002-0069937 file Nov. 12, 2002; the contents of each above-cited Korean application are incorporated by reference in their entirety.

BACKGROUND OF THE INVENTION

1. Field of the Invention

The present invention relates to a recording medium having a data structure for managing reproduction of at least multiple reproduction path video data recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RE) is one example of these new optical disks.

Figure 1:
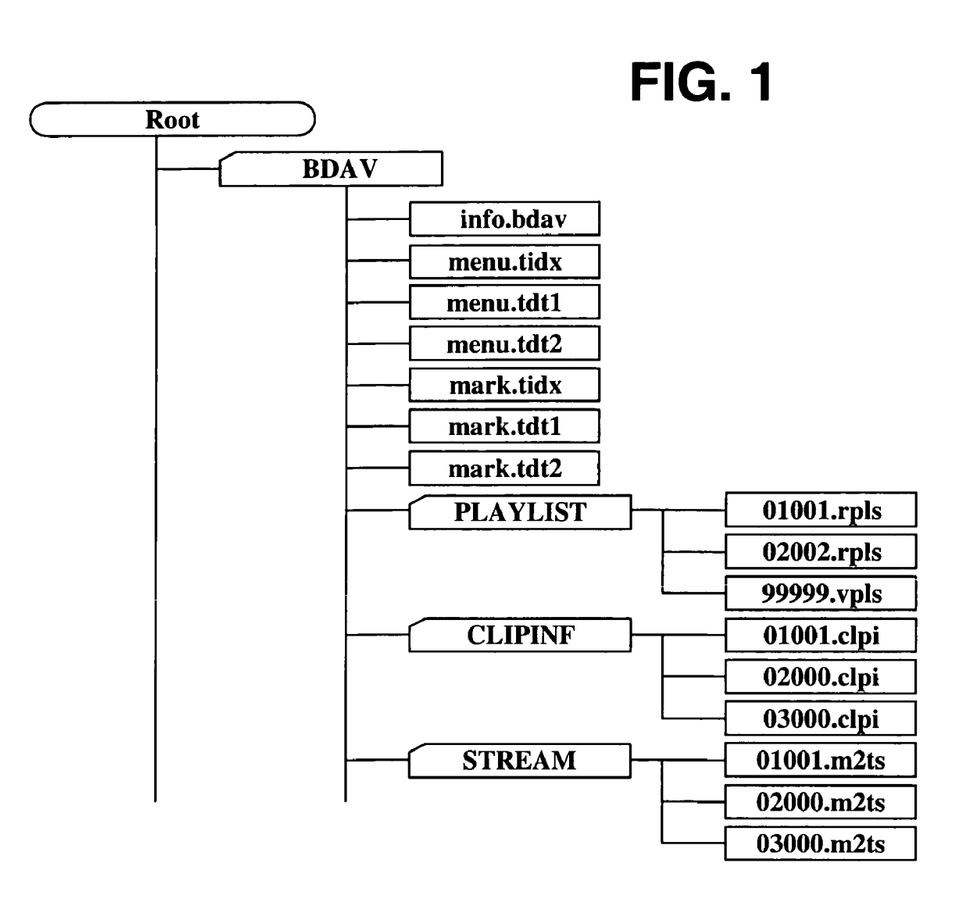
FIG. 1 illustrates the prior art file or data structure of a rewritable optical disk according to the Blu-ray Disc Rewritable (BD-RE) standard.

FIG. 1 illustrates the file structure of the BD-RE. The file structure or data structure provides for managing the reproduction of the video and audio data recorded on the BD-RE. As shown, the data structure includes a root directory that contains at least one BDAV directory. The BDAV directory includes files such as 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.bdav is stored in a general information area or areas on the optical disk.

Because the BD-RE data structure and disk format as illustrated in FIG. 1 is well-known and readily available, only a brief overview of the file structure will be provided in this disclosure.

As alluded to above, the STREAM directory includes MPEG2-formatted A/V stream files called clips or clip files. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provides general information for managing the reproduction of the A/V stream recorded on the optical disk. More specifically, the info.bdav file includes, among other things, a table of playlists that identifies the file names of the playlist in the PLAYLIST directory of the same BDAV directory.

The menu.tidx, menu.tdt1 and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

The standardization for high-density read-only optical disks such as the Blu-ray ROM (BD-ROM) is still under way. An effective data structure for managing reproduction of video and audio data recorded on the high-density read-only optical disk such as a BD-ROM is not yet available.

SUMMARY OF THE INVENTION

The recording medium according to the present invention includes a data structure for managing reproduction of at least multiple reproduction path video data (e.g., different camera angles of video data) recorded on the recording medium.

In one exemplary embodiment, the recording medium includes a data area having more than one reproduction path of video data recorded therein. Each reproduction path is recorded as at least one file, and each file associated with one reproduction path is separate from each file associated with another reproduction path such that portions of each file are not interleaved with portions of other files. Also, each file is divided into a number of jumping units.

In one exemplary embodiment, each of the separate files is a clip file. In a further exemplary embodiment, each of the jumping units includes a single entry point where the boundaries between entry points define where changes between reproduction paths are permitted.

In another exemplary embodiment, one or more management areas of the recording medium store at least one entry point map associated with each reproduction path, and each entry point map identifies entry points in the video data for the associated reproduction path. Here, each jumping unit is defined as data between two consecutive entry points in the entry point map.

In a further embodiment of the present invention, the recording medium includes one or more management areas storing at least one entry point map associated with each reproduction path. Each entry point map identifies entry points in a clip file that at least includes video data. Each clip file is associated with one of the multiple reproduction paths, and each entry point indicates a path change point in the associated reproduction path.

The present invention further provides apparatuses and methods for recording and reproducing the data structure according to the present invention.

BRIEF DESCRIPTION OF THE DRAWINGS

The above features and other advantages of the present invention will be more clearly understood from the following detailed description taken in conjunction with the accompanying drawings, in which.

DESCRIPTION OF THE PREFERRED EMBODIMENTS

In order that the invention may be fully understood, exemplary embodiments thereof will now be described with reference to the accompanying drawings.

Figure 2:
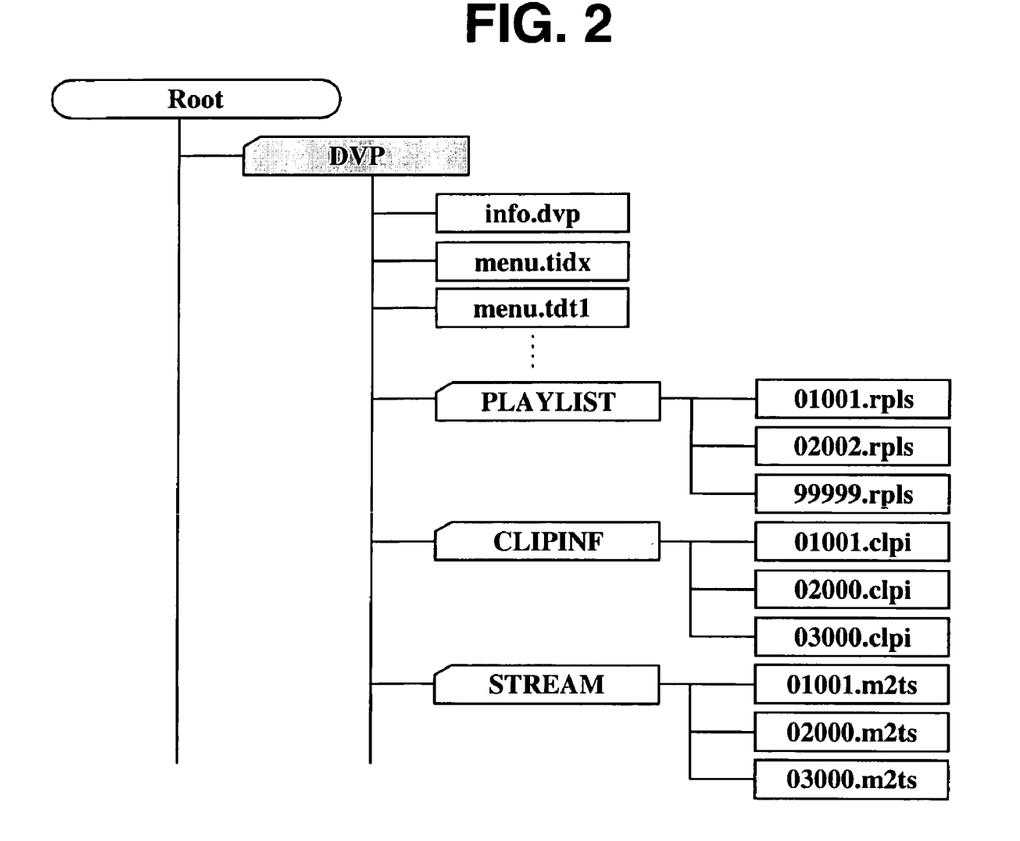
FIG. 2 illustrates an exemplary embodiment of a recording medium file or data structure according to the present invention.

A high-density optical disk, for example, a Blu-Ray ROM (BD-ROM), BD-RE, etc. in accordance with the invention may have a file or data structure for managing reproduction of video and audio data as shown in FIG. 2. Many aspects of the data structure according to the present invention shown in FIG. 2 are similar to that of the BD-RE standard discussed with respect to FIG. 1. As such these aspects will not be described in great detail.

As shown in FIG. 2, the root directory contains at least one DVP directory. The DVP directory includes a general information file info.dvp, menu files menu.tidx, menu.tdt1 among others, a PLAYLIST directory in which playlist files (e.g., real (*.rpls) and virtual (*.vpls)) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips or clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.dvp file is a general information file that provides general information for managing the reproduction of the A/V streams recorded on the optical disk. More specifically, the info.dvp file includes, among other things, a table of playlists that identifies the file names of the playlists in the PLAYLIST directory. The info.dvp file will be discussed in greater detail below with respect to the embodiments of the present invention.

Figure 3:
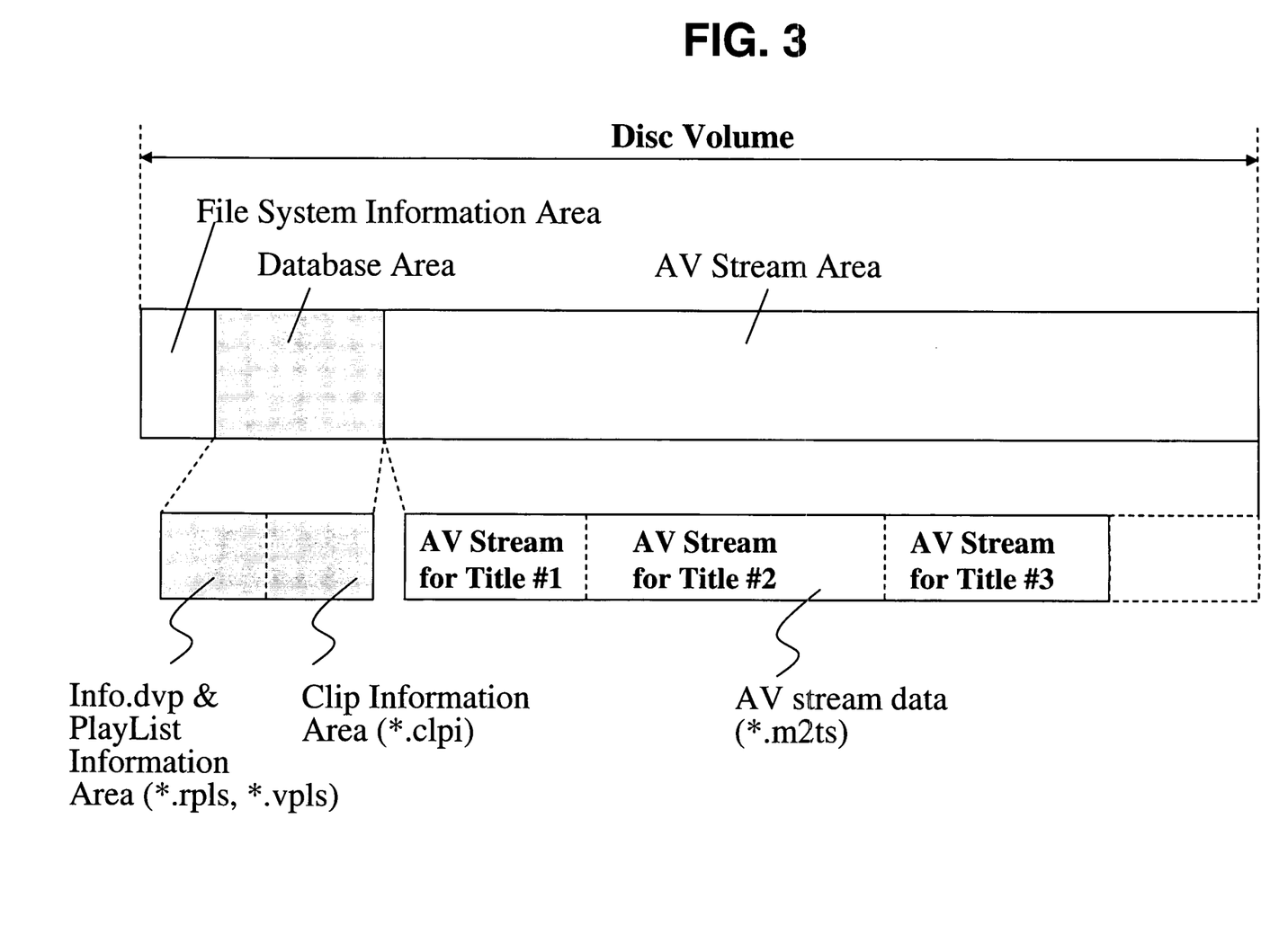
FIG. 3 illustrates an example of a recording medium having the data structure of FIG. 2 stored thereon.

In addition to illustrating the data structure of the recording medium according to an embodiment of the present invention, FIG. 2 represents the areas of the recording medium. For example, the general information file is recorded in one or more general information areas, the playlist directory is recorded in one or more playlist directory areas, each playlist in a playlist directory is recorded in one or more playlist areas of the recording medium, etc. FIG. 3 illustrates an example of a recording medium having the data structure of FIG. 2 stored thereon. As shown, the recording medium includes a file system information area, a data base area and an A/V stream area. The data base area includes a general information file and playlist information area and a clip information area. The general information file and playlist information area have the general information file recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data. It will be appreciated that the above examples of multiple reproduction path video data are not limiting, and the present invention is applicable to any type or combination of types of multiple reproduction path video data. As will be described in detail below with respect to embodiments of the present invention, the data structures according to the present invention include path management information and/or navigation information for managing reproduction of multiple reproduction path video data recorded on the recording medium.

Figure 4:
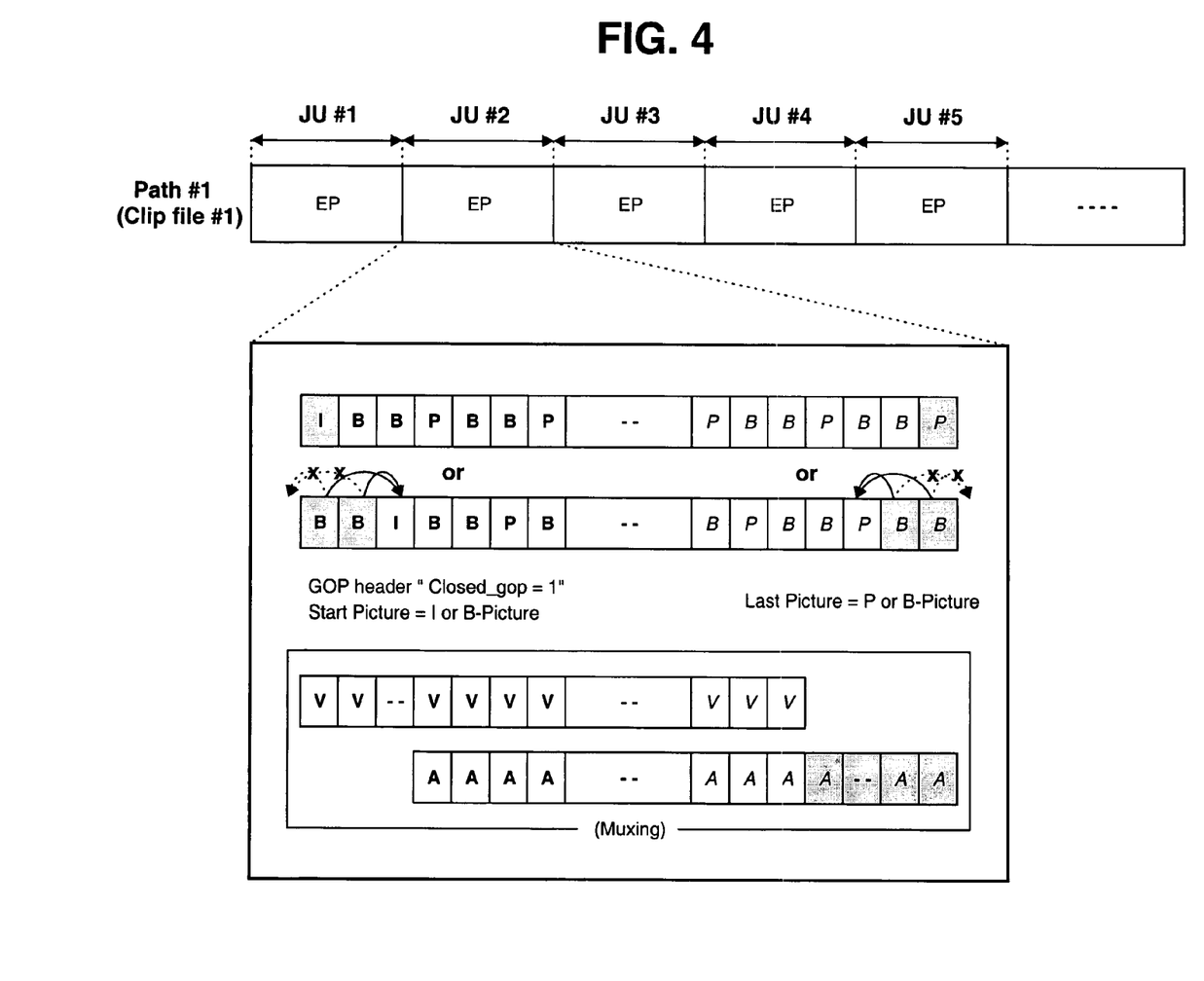
FIGS. 4-6 illustrate embodiments of the data structure associated with reproduction path management for use in the data structure according to FIG. 2.

A first embodiment of the reproduction path management information for use in the data structure according to FIG. 2 will now be described with respect to FIG. 4. According to this embodiment, the multiple reproduction path data is recorded in a plurality of clip files such that each clip files is associated with one of the reproduction paths. The clip files in this embodiment are recorded on the recording medium in a non-interleaved fashion. FIG. 4 illustrates an exemplary clip file corresponding to a reproduction path according to this embodiment of the present invention. As shown, the clip file is divided into a plurality of entry points (EPs), which are referenced in an EP map of an associated clip information file. Consecutive entry points define a single clip A/V steam file, and each entry point is a jumping unit, for example, jumping units JU#1, JU#2 and JU#3 shown in FIG. 4. During reproduction, changing between reproduction paths occurs on a jumping unit basis (i.e., on a single entry point basis). Namely, upon receipt of a reproduction path change request from a user, reproduction of the currently reproduced jumping unit is completed, and reproduction then continues at the beginning of a jumping unit in a clip file associated with the newly requested reproduction path. In this manner, the boundaries between entry points define where changes between reproduction paths are permitted.

As further shown in FIG. 4 with respect to the end of the data forming the second jumping unit JU#2, the last picture of video data in the entry point of each jumping unit is restricted to being a P-picture or B-picture. And, if the last picture is a B-picture, the last picture is restricted to refer to a preceding P-picture without referring to a following I-picture included in a subsequent entry point.

Also, auxiliary data, for example, audio data, associated with the video data corresponding to the entry point, is recorded in a state of being multiplexed with the video data. In this case, the trailing end of the entry point is recorded with only the audio data, which has a low recording bit rate, without being recorded with the video data which has a high recording bit rate. For this reason, bandwidth loss of recording bit rate occurs.

FIG. 4 further shows, with respect to the beginning of the entry point forming the second jumping unit JU#2, that the first picture of video data in the entry point is restricted to being an I-picture or B-picture. And, if the first picture is a B-picture, the first picture is restricted to referring to a following I-picture without referring to a preceding P-picture included in a previous entry point. In this case, a flag "Closed_gop=1" may be recorded in a GOP (Group Of Pictures) header of the entry point indicating that the entry point begins with a closed GOP. Namely, each jumping unit begins with a closed GOP.

Also, auxiliary data, for example, audio data, associated with the video data corresponding to the start of entry point is recorded in a state of being multiplexed with the video data. In this case, the leading end of the entry point is recorded with only the video data, which has a high recording bit rate, without being recorded with the audio data which has a low recording bit rate. For this reason, a small quantity of bandwidth loss of recording bit rate occurs.

Figure 5:
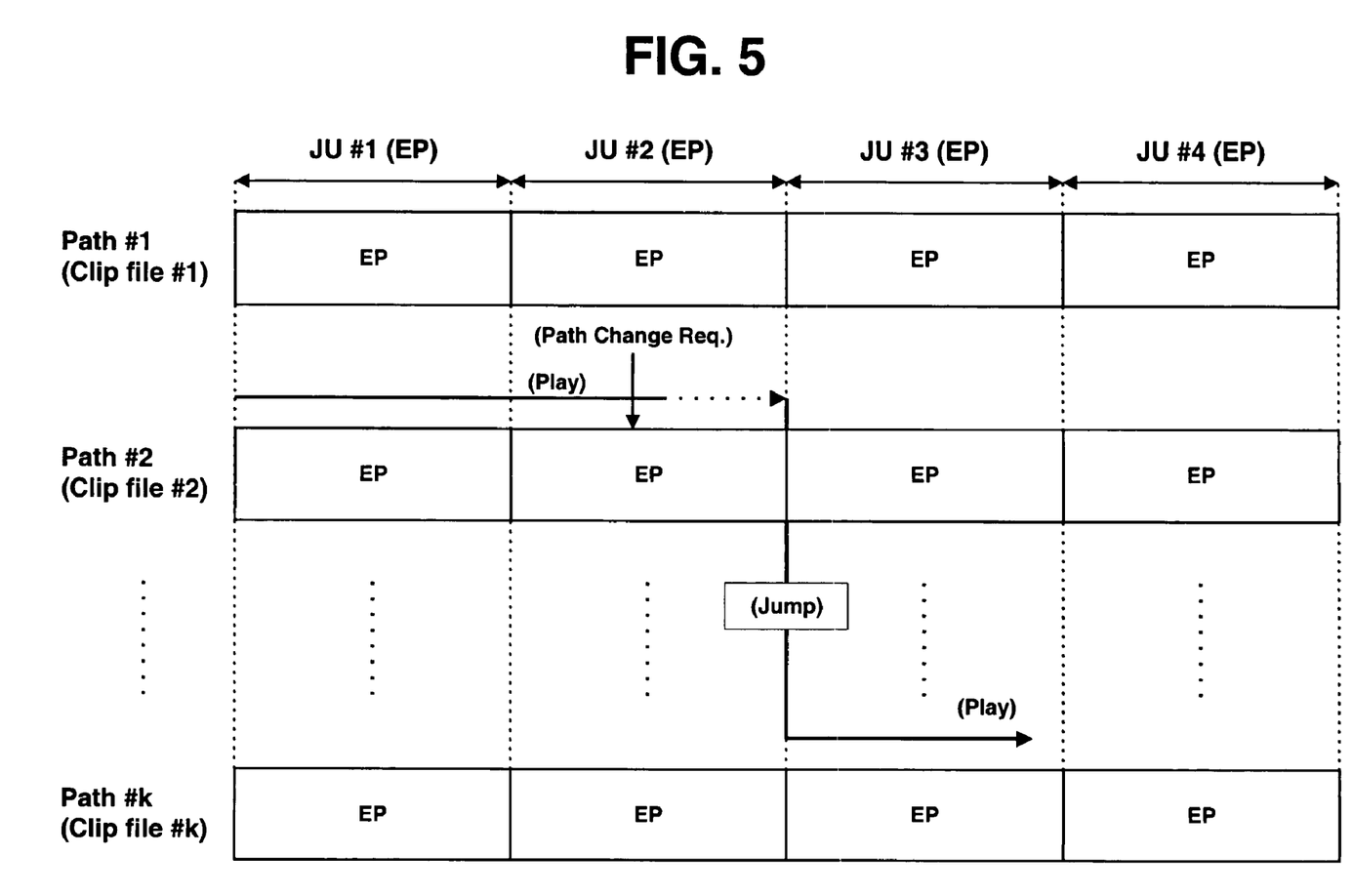

FIG. 5 illustrates an embodiment of the present invention in which reproduction path change is carried out. FIG. 5 illustrates a plurality of clip files having the same format as described above with respect to FIG. 4. As with FIG. 4, each clip file is associated with a different reproduction path. As shown in FIG. 5, each clip file may be divided into a number of jumping units and each jumping unit JU is formed of a single entry point. Each entry point may have a variable time length. Accordingly, the time length of each jumping unit JU may be variable. However, in an alternative embodiment, each entry point may have the same fixed time length. Specifically, in FIG. 5, each of first through k-th clip files Clip file #1 to Clip file #k respectively corresponding to first through k-th paths Path #1 to Path #k and are divided into first through fourth jumping units JU #1 to JU #4. Each jumping unit is shown to have the same fixed length, but the present invention is clearly not limited to this embodiment.

When a path change to a particular path is requested during reproduction of, for example, the second jumping unit JU #2 in the second clip file corresponding to the second path, as shown in FIG. 5, the second jumping unit JU #2 is completely reproduced. After the complete reproduction of the second jumping unit JU #2, the clip file of the particular path requested to be reproduced, for example, the k-th path, is searched for the start of the next entry point. That is, in this example, the third jumping unit JU #3 of the k-th Clip file is located. This clip file corresponding to the k-th path is successively reproduced in a jumped fashion, starting from the entry point forming the third jumping unit JU #3.

Thus, the data stream of the second path and the data stream of the k-th path are successively reproduced. As will be appreciated, particularly, when the entry points have different lengths, changing reproduction paths may result in a non-seamless reproduction.

Figure 6:
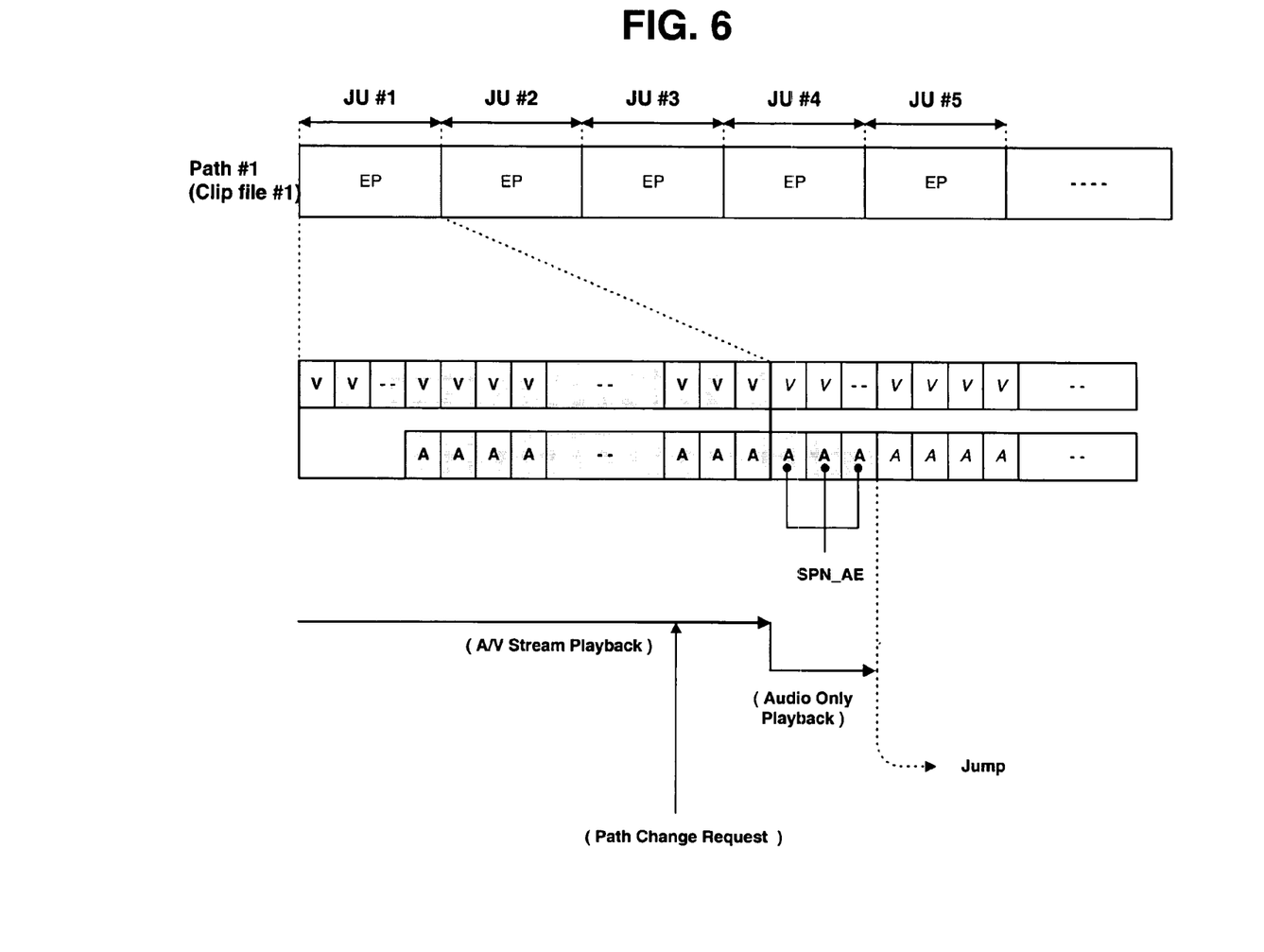

FIG. 6 illustrates an embodiment of the present invention in which reproduction path change is carried out. As shown in FIG. 6, each clip file, for example, the first clip file Clip file #1 corresponding to the first path Path #1 is managed in a divided fashion by a plurality of jumping units JU #1, JU #2, JU #3, etc. each including one entry point.

In accordance with this embodiment, audio data having an association with the video data corresponding to the trailing end of a jumping unit is recorded in a state of being multiplexed with video data corresponding to the leading end of the next jumping unit. For example, as shown, the audio data corresponding to the trailing end of the first jumping unit JU#1 is multiplexed with video data corresponding to the leading end of the second jumping unit JU #2.

In this case, it is possible to efficiently avoid bandwidth loss of recording bit rate caused by recording only audio data having a low recording bit rate, without recording video data having a high recording bit rate.

When a path change to a particular path is requested during reproduction of, for example, the first jumping unit JU #1 in the first clip file, video and audio data included in the first jumping unit JU #1 are completely reproduced. Thereafter, only the audio data associated with video data corresponding to the trailing end of the first jumping unit JU #1 and being multiplexed with the video data corresponding to the leading end of the second jumping unit JU #2, is selectively reproduced.

For example, the optical disc apparatus identifies the source packet number audio end information SPN_AE (Source Packet Number Audio End) of the audio data read out along with the video data corresponding to the leading end of the second jumping unit JU #2. The source packet number audio end information SPN_AE may be recorded, for management thereof, in a clip information file corresponding to an associated clip file or a play list file.

The selective reproduction (playback) of only the audio data recorded along with video data in the leading end of the second jumping unit JU#2 is continued until audio end information representing an end of the audio data is identified. After completion of the selective reproduction, a jumping operation for a path change may be carried out.

Also presentation time stamps (PTSs) may be recorded such that the PTS of the audio data recorded with video data in the leading end of the second jumping unit JU#2 corresponds to the PTS of the video data recorded in the trailing end of the first jumping unit JU#1; thereby enabling the video data and audio data having an association with each other to be successively reproduced.

According to another exemplary embodiment of the present invention, the entry point map in the clip information file associated with each clip file includes a jumping flag J_Flag associated with each entry point. Each jumping flag J_Flag indicates whether a change to another reproduction path is permitted, and if a change is permitted, the jumping flag J_Flag implies the point in the clip file where the jump takes place in relation to the entry point.

More specifically, according to one exemplary embodiment of the present invention, a jumping flag "J_Flag=1" indicates a change to reproducing a clip file associated with a different reproduction path is permitted (active jumping flag), and a jumping flag "J_Flag=0" indicates that no change is permitted (inactive jumping flag). Furthermore, according to one exemplary embodiment, when the jumping flag indicates that a change is permitted, the jumping flag implies that the change is permitted after reproduction of the entry point with which the jumping flag is associated. In another embodiment, the jumping flag indicates a change is permitted before reproduction of the entry point with which the jumping flag is associated.

As will be appreciated from the forgoing description of the embodiments of the present invention, each of the jumping flags for the entry points shown in FIGS. 4-6 are set to permit jumping.

Figure 7:
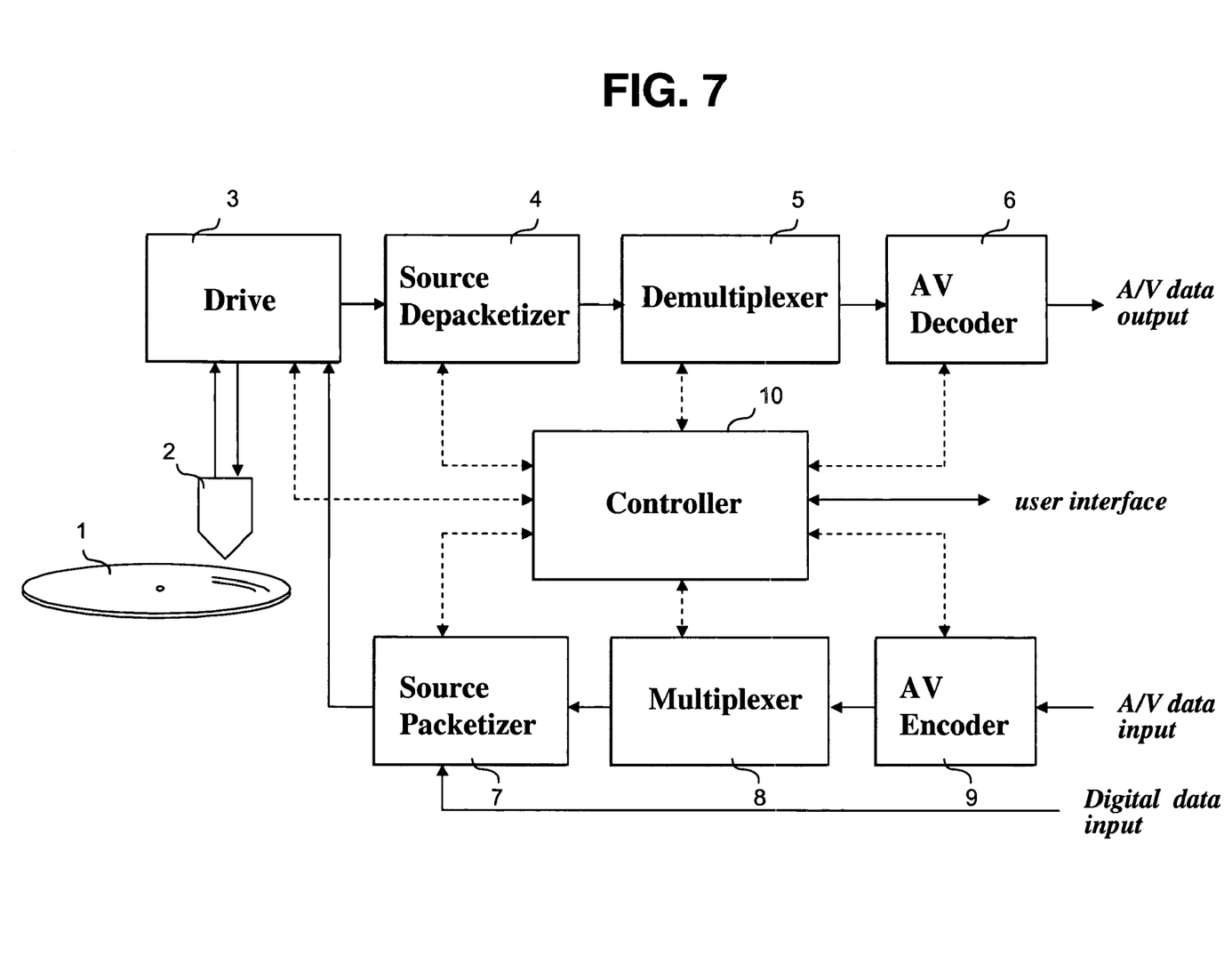
FIG. 7 illustrates a schematic diagram of an embodiment of an optical disk recording and reproduction apparatus of the present invention.

FIG. 7 illustrates a schematic diagram of an embodiment of an optical disk recording and reproducing apparatus according to the present invention. As shown, an AV encoder 9 receives and encodes audio and video data. The AV encoder 9 outputs the encoded audio and video data along with coding information and stream attribute information. A multiplexer 8 multiplexes the encoded audio and video data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 7, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the audio/video data being recorded on the optical disk. For example, based on information received via the user interface (e.g., instruction set saved on disk, provided over an intranet or internet by a computer system, etc.) the controller 10 controls the drive 3 to record the data structure of FIGS. 2 and 4, 5 or 6 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the audio/video source packets from the optical disk. For example, the user input may specify a path to reproduce. This user input may be specified, for example, via a menu based graphical user interface preprogrammed into the controller 10. Using the user input and the path management or change information reproduced from the optical disk, the controller 10 controls the reproduction of the specified path or changing the reproduction of the specified path as described in detail above with respect to the embodiments of the present invention.

The reproduced source packets are received by a source depacketizer 4 and converted into a data stream (e.g., an MPEG-2 transport packet stream). A demultiplexer 5 demultiplexes the data stream into encoded video and audio data. An AV decoder 6 decodes the encoded video and audio data to produce the original audio and video data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 7 has been described as a recording and reproducing apparatus, it will be understood that only a recording or only a reproducing apparatus may be provided using those portions of FIG. 7 providing the recording or reproducing function.

As apparent from the above description, the present invention provides a multiple reproduction path data stream managing method for high-density optical discs which can rapidly and accurately access to the data streams of the path designated by the user in a jumped fashion in order to reproduce the data streams, while being capable of minimizing a reduction in the recording efficiency of multi-path data streams.

As will be appreciated from the forgoing disclosure, the present invention provides a recording medium having a file or data structure that permits managing and/or controlling navigation of the reproduction of video data on a multiple reproduction path basis. Accordingly, the present invention provides a greater level of flexibility in the reproduction of video data than previously available.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A recording medium having an executable data structure for managing reproduction by reproducing apparatus of at least video data having multiple reproduction path recorded on the recording medium, comprising:
   a plurality of data files, each data filed including video data for one of the multiple reproduction paths,
   each data file associated with one reproduction path being separate from each data file associated with another reproduction path such that portions of each data file are not interleaved with portions of other data files, and
   each data file having at least two entry points for jumping to another reproduction path;
   one or more management files, managing reproduction operations performed by the reproducing apparatus, and including at least one entry point map,
   the at least one entry point map mapping a presentation time stamp to an address for a corresponding entry point of the data file, being associated with one of the reproduction paths and identifying entry points in the data file for the associated reproduction path, and further including information associated with each entry point, the information identifying whether a change in reproduction path is permitted in relation to the entry point and including information associated with the entry point indicating a position at which a change in reproduction path is permitted; and
   the one or more management files being separate from the at least one data file.

2. The recording medium of claim 1, wherein each of the separate data files is a clip file.

3. The recording medium of claim 2, wherein the information further includes, at least one flag associated with an entry points of the clip file, that is set to indicate a change in the reproduction path is permitted.

4. The recording medium of claim 2, wherein the clip file is a stream file including at least video data, the stream file having a plurality of source packets, each source packet including a source packet number.

5. The recording medium of claim 1, wherein each data file is divided into a number of jumping units, a jumping unit being defined as data between two consecutive entry points in an entry point map.

6. The recording medium of claim 5, wherein each jumping unit includes a single entry point of the data file.

7. The recording medium of claim 1, wherein boundaries between entry points define where changes between reproduction paths are permitted.

8. The recording medium of claim 1, wherein the reproduction paths of the video data are different camera angles of the video data.

9. The recording medium of claim 1, wherein each unit of video data starts with an I-picture.

10. The recording medium of claim 9, wherein each unit of video data starts with a closed group of pictures (GOP).

11. The recording medium of claim 1, wherein the information indicating a position for a change in reproduction path is a source packet number of the video data.

12. The recording medium of claim 1, wherein if the change in reproduction path is not permitted, a user operation to change reproduction paths is ignored.

13. The recording medium of claim 1, further comprising:
   a playlist file, the playlist file being a collection of playing intervals in a clip of the video data.

14. A recording medium having an executable data structure for managing reproduction by a reproducing apparatus of at least video data having multiple reproduction paths recorded on the recording medium, comprising:
   one or more management files, managing reproducing operations performed by the reproducing apparatus, and including at least one entry point map,
   the at least one entry point map mapping a presentation time stamp to an address for a corresponding entry point of the video data, being associated with one of the reproduction paths, indicating at least one path change point in the associated reproduction path and identifying a plurality of entry points in a clip file that at least includes video data,
   the clip file being associated with one of the multiple reproduction paths, and and wherein the entry point map further includes, information associated with each entry point, the information identifying whether a path change in the reproduction path is permitted and including information associated with the entry point indicating a position at which the path change is permitted; and the one or more management file being separate from the clip files.

15. The recording medium of claim 14, wherein the information includes at least one flag associated with an entry points of the clip file, that is set to indicate a change in the reproduction path is permitted.

16. The recording medium of claim 14, further comprising:
at least one clip file associated with each reproduction path, wherein portions of each clip file are not interleaved with portions of other clip files.

17. A method of recording a data structure for managing reproduction of at least video data having multiple reproduction paths on a recording medium, comprising:
recording video data having reproduction paths in data files of the recording medium,
each data file associated with one reproduction path being separate from each data file associated with another reproduction path such that portions of each data file are not interleaved with portions of other data files, and
each data file having at least two entry points for jumping to another reproduction path; and
recording at least one entry point map associated with each reproduction path in one or more management files of the recording medium,
the at least one entry point map mapping a presentation time stamp to an address for a corresponding entry point of the video data, and identifying entry points in the video data for the associated reproduction path, and further wherein the entry point maps includes information associated with each entry point identifying whether a change in reproduction path is permitted in relation to the entry point and including information associated with the entry point indicating a position at which the change in reproduction path is permitted; and
the one or more management files being separate from the data files.

18. The recording method of claim 17, wherein each of the separate data files is a clip file, and the information includes at least one flag associated with at least one of the entry points of the clip file, that is set to indicate a change in the reproduction path is permitted.

19. The method of claim 17, wherein the information indicating a position at which a change in reproduction path is permitted and the address used by the entry point map is a source packet number of the video data.

20. A method of reproducing a data structure for managing reproduction of at least video data having multiple reproduction paths recorded on a recording medium, comprising:
reading at least one entry point map associated with each reproduction path from one or more management files of the recording medium,
the entry point map mapping a presentation time stamp to an address for a corresponding entry point of the video data, and identifying entry points in the video data for the associated reproduction path; and
reproducing video data from data files of the recording medium according to the entry point map,
each reproduction path of the multiple reproduction paths recorded as at least one data file,
each data file associated with one reproduction path being separate from each data file associated with another reproduction path such that portions of each data file are not interleaved with portions of other data files, and
each data file having at least two entry points for jumping to another reproduction path,
wherein the at least one entry point map includes information associated with each entry point identifying whether a change in reproduction path is permitted in relation to the entry point, and including information associated with the entry point indicating a position at which the change in reproduction path is permitted; and
the one or more management file being separate from the data files.

21. The reproducing method of claim 20, further comprising:
changing a reproduction path between multiple reproduction paths at an entry point at which the change in reproduction path is permitted, if a request for changing a reproduction path is generated.

22. The reproducing method of claim 20, wherein each of the separate data files is a clip file, and the information includes at least one flag associated with at least one of the entry points of the clip file, that is set to indicate a change in the reproduction path is permitted.

23. The method of claim 20, wherein the information indicating a position at which a change in reproduction path is permitted and the address used by the entry point map is a source packet number of the video data.

24. An apparatus for recording a data structure for managing reproduction of at least video data having multiple reproduction paths on a recording medium, comprising:
an optical pickup configured to record data on the recording medium; and
a controller, operatively coupled to the optical pickup, configured to control the optical pickup to record the video data having multiple reproduction paths in a plurality of data files of the recording medium,
each data file associated with one reproduction path being separate from each data file associated with another reproduction path such that portions of each data file are not interleaved with portions of other data files, and
each data file having at least two entry points for jumping to another reproduction path;
said controller further configured to control the optical pickup to record at least one entry point map associated with each reproduction path in one or more management files of the recording medium,
the at least one entry point map mapping a presentation time stamp to an address for a corresponding entry point of the video data, and identifying entry points in the video data for the associated reproduction path, and further including information associated with each entry point identifying whether a change in reproduction path is permitted in relation to the entry point, and including information associated with the entry point indicating a position at which the change in reproduction path is permitted; and
the one or more management files being separate from the data files.

25. The recording apparatus of claim 24, further comprising;
- an encoder configured to encode at least video data; a multiplexer configured to multiplex at least video data to create a transport stream according to control information of the controller.

26. The recording apparatus of claim 25, further comprising:
- a packetizer configured to packetize the transport stream from the multiplexer into source packets in accordance with a format of an optical disk, wherein said packetizer is controlled by the controller.

27. An apparatus for reproducing a data structure for managing reproduction of at least video data having multiple reproduction paths recorded on a recording medium, comprising:
- an optical pickup configured to reproduce data recorded on the recording medium;
- a controller, operatively coupled to the optical pickup, configured to control the optical pickup to read at least one entry point map associated with each reproduction path from one or more management files of the recording medium,
    - the entry point map mapping a presentation time stamp to an address for a corresponding entry point of the video data, and identifying a plurality of entry points in the video data for the associated reproduction path;
- said controller further configured to control the optical pickup to reproduce more than one reproduction path of video data from data files of the recording medium, wherein each reproduction path is recorded as at least one data file,
    - each data file associated with one reproduction path being separate from each data file associated with another reproduction path such that portions of each data file are not interleaved with portions of other data files, and
    - each data file having at least two entry points for jumping to another reproduction path;
- wherein the entry point maps include information associated with each entry point identifying whether a change in reproduction path is permitted in relation to the entry point, and including information associated with the entry point indicating a position at which the change in reproduction path is permitted; and
- the one or more management files being separate from the data files.

28. The reproducing apparatus of claim 27, wherein said controller is configured to change a reproduction path between multiple reproduction paths at each entry point if a request for changing a reproduction path is generated.

29. The reproducing apparatus of claim 27, wherein each of the separate data files is a clip file, and the information includes at least one flag associated with at least one of the entry points of the clip file, that is set to indicate a change the in reproduction path is permitted.

* * * * *